United States Patent
Lin

(10) Patent No.: US 11,937,174 B2
(45) Date of Patent: Mar. 19, 2024

(54) MULTI-SSID HIDDEN WIRELESS NETWORK

(71) Applicant: Palo Alto Networks, Inc., Santa Clara, CA (US)

(72) Inventor: Ta Chien Lin, Oakland, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 229 days.

(21) Appl. No.: 17/448,251

(22) Filed: Sep. 21, 2021

(65) Prior Publication Data
US 2023/0089624 A1     Mar. 23, 2023

(51) Int. Cl.
*H04W 48/16* (2009.01)
*H04W 12/02* (2009.01)
*H04W 48/14* (2009.01)
*H04W 48/18* (2009.01)

(52) U.S. Cl.
CPC ........... *H04W 48/16* (2013.01); *H04W 12/02* (2013.01); *H04W 48/14* (2013.01); *H04W 48/18* (2013.01)

(58) Field of Classification Search
CPC ..... H04W 48/14; H04W 48/16; H04W 48/18; H04W 12/02
See application file for complete search history.

(56) References Cited

U.S. PATENT DOCUMENTS

| | | | |
|---|---|---|---|
| 7,313,111 B2 | 12/2007 | Hietalahti et al. | |
| 7,647,048 B2 | 1/2010 | Brok et al. | |
| 8,116,287 B2 | 2/2012 | Krantz et al. | |
| 10,849,159 B2 | 11/2020 | Patil et al. | |
| 11,405,789 B1* | 8/2022 | Wei | H04W 60/00 |
| 2007/0002884 A1* | 1/2007 | Jaakkola | H04W 48/16 455/515 |
| 2019/0268825 A1* | 8/2019 | Patil | H04W 40/246 |
| 2020/0128531 A1* | 4/2020 | Min | H04W 72/21 |

(Continued)

OTHER PUBLICATIONS

"Cisco IOS Configuration Guide for Autonomous Aironet Access Points Cisco IOS Release 15.3(3)JAB", CISCO, Chapter: Configuring Multiple SSIDs, retrieved on Aug. 13, 2021 from https://www.cisco.com/c/en/us/td/docs/wireless/access_point/15-3-3/configuration/guide/cg15-3-3/cg15-3-3-chap7-mbssid.html, Oct. 30, 2020, 12 pages.

(Continued)

*Primary Examiner* — Wayne H Cai
(74) *Attorney, Agent, or Firm* — Gilliam IP PLLC

(57) ABSTRACT

An access point provides a hidden wireless network that is configured with a set of SSIDs so that the hidden network is discoverable with multiple different SSIDs. Based on detection of a probe request frame which indicates an SSID from a device, the access point determines if the SSID for which network availability is requested matches one of the SSIDs in the set. If the SSID does match one of those included in the set, the SSID correctly identifies the hidden network, and the access point responds with a probe response frame. Devices connected to the hidden network may have initiated the establishment of the connection with a different SSIDs despite the hidden network being a single wireless network. Scaling the number of supported SSIDs therefore does not impact the frequency with which the access point transmits beacon frames for the hidden network.

20 Claims, 4 Drawing Sheets

(56) References Cited

U.S. PATENT DOCUMENTS

2020/0221378 A1* 7/2020 Kneckt ................ H04W 48/14

OTHER PUBLICATIONS

"Configure Multiple SSIDs on a Network", CISCO, Document ID: SMB5652, retrieved on Aug. 4, 20 from https://www.ciscocom/c/en/us/support/docs/smb/routers/cisco-rv-series-small-business-routers/smb5652-configure-multiple-ssids-on-a-network.html, Jan. 6, 2021, 11 pages.

"How to configure Multi-SSID mode of the Wireless N Access Point (new logo)?", Kasa Smart, TP-Link, retrieved on Aug. 10, 2021 from https://www.tp-link.com/us/support/faq/1607/, Apr. 26, 2017, 4 pages.

* cited by examiner

MULTI-SSID HIDDEN WIRELESS NETWORK

BACKGROUND

The disclosure generally relates to wireless communication networks and to devices specially adapted for wireless communication networks, e.g., access point devices.

Wi-Fi networks are wireless local area networks (WLANs) which are based on the Institute of Electrical and Electronics Engineers (IEEE) 802.11 technical standards. Wireless access points, also simply referred to as access points, are hardware devices that connect to wired networks (e.g., Ethernet) and provide the wireless connection by which Wi-Fi compatible devices can connect to wired networks. Access points are associated with a basic service set identifier (BSSID) which corresponds to the media access control (MAC) address of the access point and uniquely identifies the access point. A Wi-Fi network provided by an access point is identified or named with a service set identifier (SSID). Generally, an SSID of a Wi-Fi network is broadcast to Wi-Fi compatible devices in range through periodic transmission of beacon frames by the associated access point. Beacon frames include fields for the SSID which identifies the associated Wi-Fi network and other information about the network. Wi-Fi networks for which a device is in range are identified to the device by their respective SSIDs upon receipt of the respective beacon frames. Access points associated with Wi-Fi networks which are hidden ("hidden networks"), however, omit the SSID from the transmitted beacon frames that include other information about the network. As a result, devices attempting to associate with the access point and connect to the Internet via the hidden network should provide the correct SSID of the hidden network to the access point in a probe request frame. If an SSID is not provided or the provided SSID is incorrect, the access point will not respond to the device with a probe response, and the device will be unable to discover the hidden network to initiate and complete authentication to and association with the access point.

BRIEF DESCRIPTION OF THE DRAWINGS

Embodiments of the disclosure may be better understood by referencing the accompanying drawings.

DESCRIPTION

Figure 1:
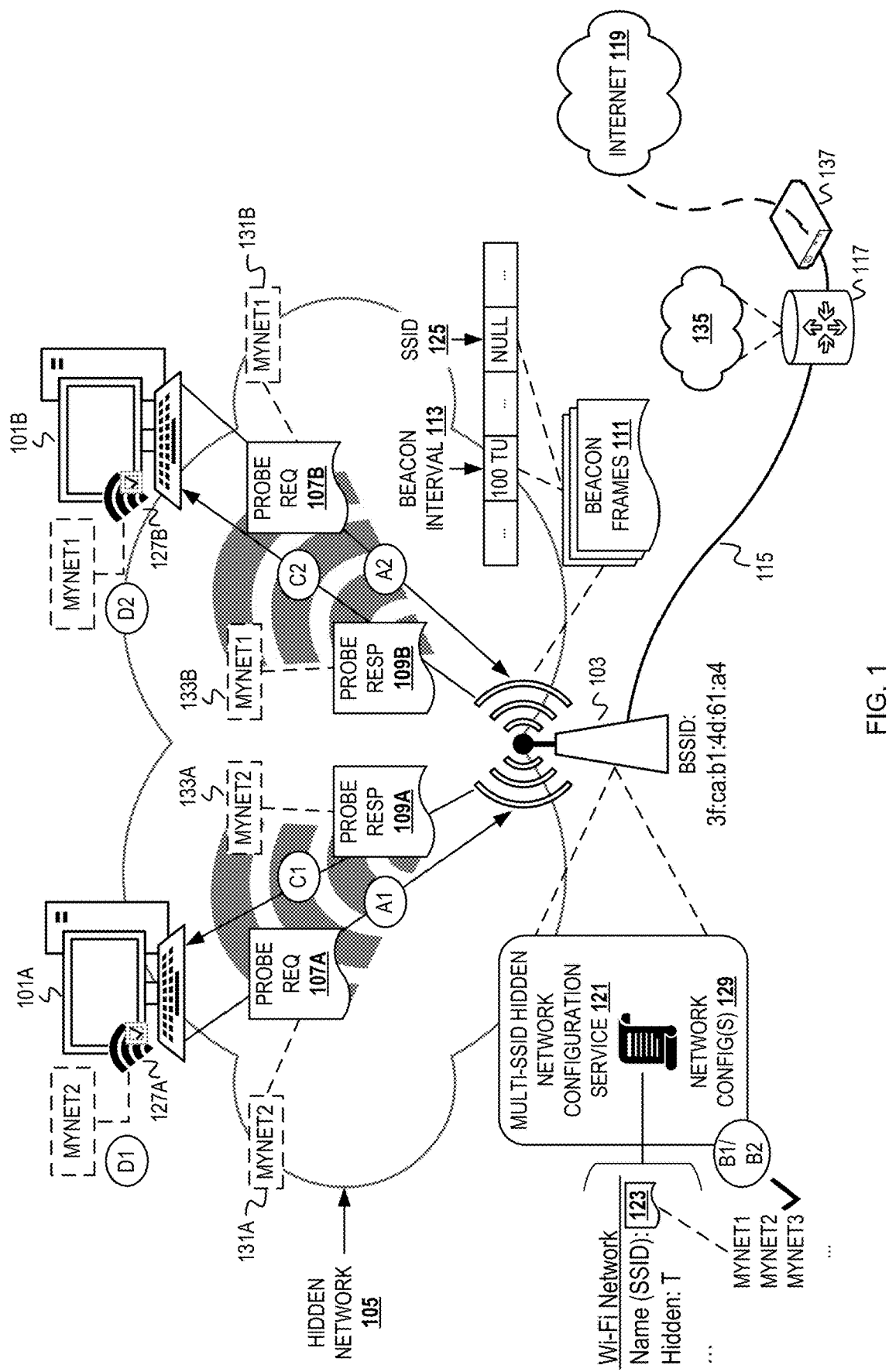
FIG. 1 depicts a conceptual diagram of creating a hidden wireless network discoverable using any of multiple SSIDs in a manner compatible with WLAN protocol.

The description that follows includes example systems, methods, techniques, and program flows that embody aspects of the disclosure. However, it is understood that this disclosure may be practiced without these specific details. For instance, this disclosure refers to access points which connect to a router via a wired connection (e.g., with an Ethernet cable) for creation of a WLAN in illustrative examples. Aspects of this disclosure can be instead applied to other hardware configurations by which WLANs can be created, such as wireless routers which comprise an access point. In other instances, well-known instruction instances, protocols, structures and techniques have not been shown in detail in order not to obfuscate the description.

Overview

In some cases, it is desirable to configure an access point to provide more than one wireless network and thus support more than one SSID. For example, businesses open to the public may utilize a public network for use by customers as well as a private network for use by employees. Another situation that is becoming increasingly common with the rise of work from home solutions is the case where an employee working from home utilizes a wireless network separate from their own, personal Wi-Fi for work-related tasks. In these cases, the associated wireless access point (hereinafter "access point") will create and maintain multiple wireless networks each identifiable with its own SSID. However, as the number of wireless networks supported by the access point increases, the quantity of beacon frames transmitted by the access point also increases proportionally. For instance, while an access point for one wireless network may transmit 10 beacon frames per second to advertise the SSID of the wireless network, increasing the number of wireless networks supported by the access point to three to provide distinct wireless networks for three different individuals also increases transmission of beacon frames to 30 beacon frames per second to advertise the SSIDs of each of the wireless networks. As a result, the Wi-Fi channel being used can become crowded with transmitted beacon frames as the number of wireless networks scales up. This can be detrimental to the experience of users of devices connected to wireless networks via access points using that channel due to the many beacon frames being transmitted.

Disclosed herein are techniques for supporting multiple SSIDs on a single hidden wireless network (hereinafter simply "hidden network") made available by an access point, where each of the SSIDs appears to correspond to a distinct hidden network from the perspective of the user/device. Rather than maintaining a single indication of an SSID which identifies a hidden network, the access point maintains indications of multiple SSIDs, any of which can be used to discover the hidden network. Based on detection of a request to discover the hidden network that is transmitted from a device (e.g., a probe request frame), the access point determines if an SSID indicated in the request correctly identifies the hidden network based on matching one of the SSIDs in the set. If the SSID does match one included in the set, the SSID is determined to correctly identify the hidden network of which the device is attempting discovery or determining availability. The access point then responds to the request with a response indicating that SSID (e.g., through transmittal of a probe response frame) so that the device can successfully discover the hidden network identified by the SSID and complete authentication to and association with the access point. Authentication and association may be based on the security measures enforced by the access point for establishment of a network connection (e.g., a particular Wi-Fi Protected Access (WPA) mode and version). Different devices connected to the hidden network may have initiated the establishment of the connection with a different SSIDs despite the hidden network being a single wireless network. The result is a many-to-one ratio of SSIDs to a BSSID which identifies the access point, or many SSIDs per one BSSID, rather than a one-to-one ratio, or one SSID per BSSID. Scaling the number of supported SSIDs therefore does not impact the frequency with which the access point transmits beacon frames for the hidden network.

Additionally, some solutions for providing multiple wireless networks on one access point are achieved through configuration on both the device side and the access point side, such as those which involve changes to WLAN protocols (e.g., with respect to frame structure). This can create compatibility issues for legacy devices for which software updates may not be available since the software which supports such solutions cannot be installed on the devices. Because the multi-SSID hidden network is created through configuration on the access point side alone without changes to WLAN protocol which impact both the access point and devices, legacy devices are compatible with the hidden network and can achieve network connectivity in the same manner as other devices.

Example Illustrations

FIG. 1 depicts a conceptual diagram of creating a hidden wireless network discoverable using any of multiple SSIDs in a manner compatible with WLAN protocol. FIG. 1 depicts an access point 103 with BSSID 3f:ca:b1:4d:61:a4. The access point 103 is a wireless access point which creates a Wi-Fi network by which Wi-Fi compatible devices can wirelessly connect to a local area network (LAN) 135 which provides for connectivity to the Internet 119. The access point 103 is connected to a router 117 with a cable 115 (e.g., an Ethernet cable), where the router 117 has created the LAN 135. While the access point 103 is depicted as a standalone hardware device in this example, other implementations may utilize wireless routers having access point functionality. The router 117 is connected to a modem 137 to provide access to the Internet 119 via the LAN 135.

The Wi-Fi network which the access point 103 provides for wireless connections to the LAN 135 and access to the Internet 119 in this example is a hidden network 105. The hidden network 105 is a Wi-Fi network (i.e., a WLAN based on the IEEE 802.11 standards), which has been configured as a hidden network—that is, beacon frames 111 transmitted by the access point 103 for the hidden network 105 omit SSID information associated with the hidden network 105. In particular, the beacon frames 111 include an SSID field 125 which is null. The beacon frames 111 also include a beacon interval field 113, the value of which is the frequency with which the access point 103 transmits beacon frames. In this example, the beacon interval field 113 indicated in the beacon frames 111 specifies a value of 100 time units (TU), or 102.4 milliseconds. Thus, the access point 103 approximately transmits ten beacon frames per second for the hidden network 105. FIG. 1 depicts the beacon frames 111 as a set of frames for clarity, though in implementations, individual beacon frames will be transmitted with the frequency indicated in the beacon interval field 113.

A multi-SSID hidden network configuration service ("service") 121 executes on the access point 103. The service 121 supports configuration of the hidden network 105 with multiple SSIDs to provide a one-to-many mapping between the hidden network 105 provided by the access point 103 and the SSIDs which identify the hidden network 105. The access point 103 may have been configured with the service 121 through installation of the service 121 on the access point 103. The service 121 can access a configuration 129 (e.g., which is installed on or otherwise accessible to the access point 103) which comprises a configuration of the hidden network 105 provided by the access point 103. The configuration 129 may be a configuration file(s) or other configuration data which the access point 103 downloaded and installed for creation of the hidden network 105. FIG. 1 depicts an example configuration of the hidden network 105 specified in the configuration 129 which indicates that the property "hidden" is set to "true" as well as a set of supported SSIDs ("SSID set") 123 with which the access point has been configured. The SSID set 123 comprises one or more SSIDs which have been defined for the hidden network 105. Conventionally, an SSID field for a wireless network such as the hidden network 105 has a single value by which the network can be identified; however, as shown in FIG. 1, the access point 103 maintains multiple different SSIDs that can be utilized to identify the hidden network 105. As a result, any SSID in the SSID set 123 can be used for connecting to the hidden network 105 despite the hidden network 105 being one wireless network. The SSID set 123 may be a data structure maintained by the service 121. In this example, the SSID set 123 at least includes SSIDs of "MYNET1," "MYNET2," and "MYNET3."

The configuration 129 can also specify a mode and/or version of security to be used for the hidden network 105. In some examples, the configuration 129 may specify a version of WPA-Enterprise as the security mode for the hidden network 105. In such examples, the SSID set 123 may further include, for each of the SSIDs, a corresponding authentication server profile to be used for user authentication. Each of the authentication server profiles may correspond to different authentication servers. For instance, the SSID "MYNET1" may indicate a first Remote Authentication Dial-In User Service (RADIUS) server profile that at least comprises an IP address of a first RADIUS server. The SSIDs "MYNET2" and "MYNET3" may then indicate second and third RADIUS server profiles which at least comprise IP addresses of respective second and third RADIUS servers that are different from the first RADIUS server. The particular RADIUS server which is used during user authentication following successful discovery of the hidden network 105 by a device is that which corresponds to the SSID in the SSID set 123 by which the device discovered the hidden network 105.

FIG. 1 is annotated with a series of letters A1-D1 and A2-D2. These letters represent stages of operations. Although these stages are ordered for this example, the stages illustrate one example to aid in understanding this disclosure and should not be used to limit the claims. Subject matter falling within the scope of the claims can vary with respect to the order and some of the operations. Additionally, the stages of operations represented by each of A1-D1 and A2-D2 exemplify stages of operations corresponding to two different devices connecting to a hidden network with distinct SSIDs. The sets of operations performed for each of the devices may be performed at least partially in parallel or in concurrently or may be performed during different time periods.

At stage A1, a device 101A sends out a probe request 107A that is received by the access point 103. In the context of Wi-Fi networks, probe request frames are sent by Wi-Fi compatible devices to determine availability of Wi-Fi networks in range. The device 101A can be any Wi-Fi compatible device. The probe request 107A which is broadcast comports to the probe request frame format per WLAN protocol. For instance, the probe request 107A at least includes a MAC header which indicates that the frame is being sent with broadcast transmission (e.g., based on indicating a BSSID of "ff:ff:ff:ff:ff:ff") and a frame body of variable length. The probe request 107 also includes an indication of an SSID 131A, depicted as "MYNET2." Because the device 101A is attempting to establish a network connection with a network which has been hidden (i.e., the hidden network 105), and the SSID(s) which identify the hidden network 105 are not indicated in the beacon frames 111, the probe request 107A should specify an SSID which correctly identifies the hidden network 105 for which the device 101A is determining availability. An SSID correctly identifies the hidden network 105 if it is indicated in the SSID set 123 associated with the hidden network 105. The value of the SSID 131A indicated in the probe request 107 may have been obtained from input by a user of the device 101A, such as upon selecting "Hidden Network" from a list of names/SSIDs of Wi-Fi networks in range of the device 101A and being prompted to enter a name of the desired hidden network during setup of a network profile (e.g., through input of an SSID, security type, and user credentials).

At stage A2, a device 101B sends out a probe request 107B that is received by the access point 103. The device 101B can be any Wi-Fi compatible device. As with the probe request 107A, the probe request 107B which is broadcast comports to the probe request frame format per WLAN protocol. The probe request 107B includes an indication of an SSID 131B, depicted as "MYNET1," which is different from the SSID 131A which was provided in the probe request 107A communicated from the device 101A. As similarly described above, the SSID 131B is provided in the probe request 107B because the device 101B is attempting to establish a network connection with a hidden network, or the hidden network 105, so an SSID which correctly identifies the hidden network 105 should be provided in the probe request 107B. The value of the SSID 131B indicated in the probe request 107B may have been obtained from input by a user of the device 101B during setup of a network profile on the device 101B.

At stage B1, the access point 103 detects the probe request 107A and determines whether to respond based on the probe request 107A correctly identifying the hidden network 105. The service 121 determines the SSID 131A indicated in the probe request 107A and determines whether this SSID 131A is a recognized SSID of the hidden network 105. The service 121 can determine the SSID indicated in probe requests such as the probe request 107A based on a known offset or index associated with frame bodies of probe request frames per wireless network protocol. To determine whether the SSID 131A is recognized for the hidden network 105, the service 121 compares the SSID 131A to the SSID set 123 to determine if the SSID 131A indicated in the SSID set 123. In this example, the SSID 131A which the service 121 determined from the probe request 107A, or "MYNET2," is included in the SSID set 123 with which the hidden network 105 has been configured and thus correctly identifies the hidden network 105.

At stage B2, the access point 103 detects the probe request 107B and determines whether to respond based on the probe request 107B correctly identifying the hidden network 105. The service 121 determines the SSID 131B indicated in the probe request 107B and determines whether this SSID 131B is a recognized SSID of the hidden network 105. The service 121 compares the SSID 131B to the SSID set 123 to determine if the SSID 131B is indicated in the SSID set 123. In this example, although the SSID 131B which the service 121 determined from the probe request 107B is different from the SSID 131A from the probe request 107A, the service 121 determines that this SSID 131B, or "MYNET1," is included in the SSID set 123 with which the hidden network 105 has been configured and thus also correctly identifies the hidden network 105.

At stage C1, the access point 103 sends a probe response 109A to the device 101A. Because the SSID 131A indicated in the probe request 107A was a correct SSID for the hidden network 105, the access point 103 responds with a probe response frame indicating an SSID 133A which is the same SSID as was provided in the probe request 107A (i.e., "MYNET2"). The probe response 109A comports to the probe response frame format per WLAN protocol. For instance, the probe response 109A at least includes a MAC header which indicates that the frame is being sent with unicast transmission and a frame body of variable length that indicates the SSID 133B which identifies the hidden network 105.

At stage C2, the access point 103 sends a probe response 109B to the device 101B. Because the probe request 107B indicated a correct SSID for the hidden network 105, the access point 103 responds with a probe response frame indicating an SSID 133B which is the same SSID as was provided in the probe request 107B (i.e., "MYNET1"). The probe response 109B comports to the probe response frame format per WLAN protocol. For instance, the probe response 109B at least includes a MAC header which indicates that the frame is being sent with unicast transmission and a frame body of variable length that indicates the SSID 133B which identifies the hidden network 105.

At stage D1, while not depicted in detail in FIG. 1, upon receipt of the probe response 109A, the device 101A and the access point 103 can complete the authentication and association process specified by WLAN protocol. During this process, the device 101A can supply to the access point 103 authentication credentials collected from the associated user as specified by the Wi-Fi security mode used by the access point 103 (e.g., WPA-Personal, WPA-Enterprise, etc.). If the user of the device 101A can be authenticated based on the supplied credentials and they are thus authorized to use the hidden network 105, a connection 127A to the hidden network 105 is established using the SSID "MYNET2." As a result of establishment of the connection 127A, the device 101A is a wireless client of the hidden network 105 using the SSID "MYNET2" and is connected to the Internet 119.

At stage D2, while not depicted in detail in FIG. 1, upon receipt of the probe response 109B, the device 101B and the access point 103 can complete the authentication and association process specified by WLAN protocol. During this process, the device 101B can supply to the access point 103 authentication credentials collected from the associated user as specified by the Wi-Fi security mode used by the access point 103. If the user of the device 101B can be authenticated based on the supplied credentials and they are thus authorized to use the hidden network 105, a connection 127B to the hidden network 105 is established using the SSID "MYNET1." With the establishment of the connection 127B, the device 101B is also a wireless client of the hidden network 105 but using the SSID "MYNET1" and is connected to the Internet 119.

As can be seen from FIG. 1, although the SSIDs provided to the access point 103 in the probe requests 107A, 107B for the hidden network 105 were different, the service 121 determined that each of the SSIDs correctly identified the hidden network 105. Thus, the service 121 having installed a set of SSIDs such as the SSID set 123 allows multiple devices to each establish an Internet connection via the hidden network 105 with different SSIDs. From the perspective of the devices 101A, 101B, the hidden networks named "MYNET1" and "MYNET2" are distinct Wi-Fi networks; however, from the perspective of the access point 103, the devices 101A, 101B are attempting to discover the same network—the hidden network 105. As a result, rather than transmitting beacon frames corresponding to different wireless networks for each of the SSIDs in the SSID set and thereby increasing the frequency of beacon frames transmitted as the number of SSIDs and thus wireless networks increases, the access point 103 transmits beacon frames which correspond to a single wireless network which can be discovered with one of multiple SSIDs indicated in the SSID set. The access point 103 transmits beacon frames for the hidden network 105 at the same beacon interval regardless of the number of SSIDs supported for the hidden network, so there is a one-to-many mapping between the actual number of hidden networks provided by the access point 103 and the "perceived" number of hidden networks discoverable by devices. As the number of SSIDs and thus perceived hidden networks scales up, the number of actual hidden networks remains the same at one without increasing the frequency with which the access point 103 transmits beacon frames, thus preventing crowding of the Wi-Fi channel used for the hidden network 105.

Additionally, the hidden network 105 can be logically segregated or segmented by SSID to provide for enhanced security since devices connected to the hidden network 105 using different SSIDs may be accessing different resources because of varying contexts of the associated connections, such as if the SSIDs correspond to different companies' employees. For instance, the service 121 may implement virtual local area network (VLAN) tagging so that each SSID is associated with a different VLAN. In this case, the configuration 129 may have associated with each SSID in the SSID set 123 an identifier of a VLAN to which connections established using that SSID will correspond. The service 121 may otherwise enforce separation of network traffic by device or SSID so that devices connected to the hidden network 105 via the same SSID or different SSIDs cannot communicate directly with each other over the hidden network 105. As a result, connections to the hidden network established using different SSIDs will still be secure despite the SSIDs corresponding to the same network (i.e., the hidden network).

Figure 2:
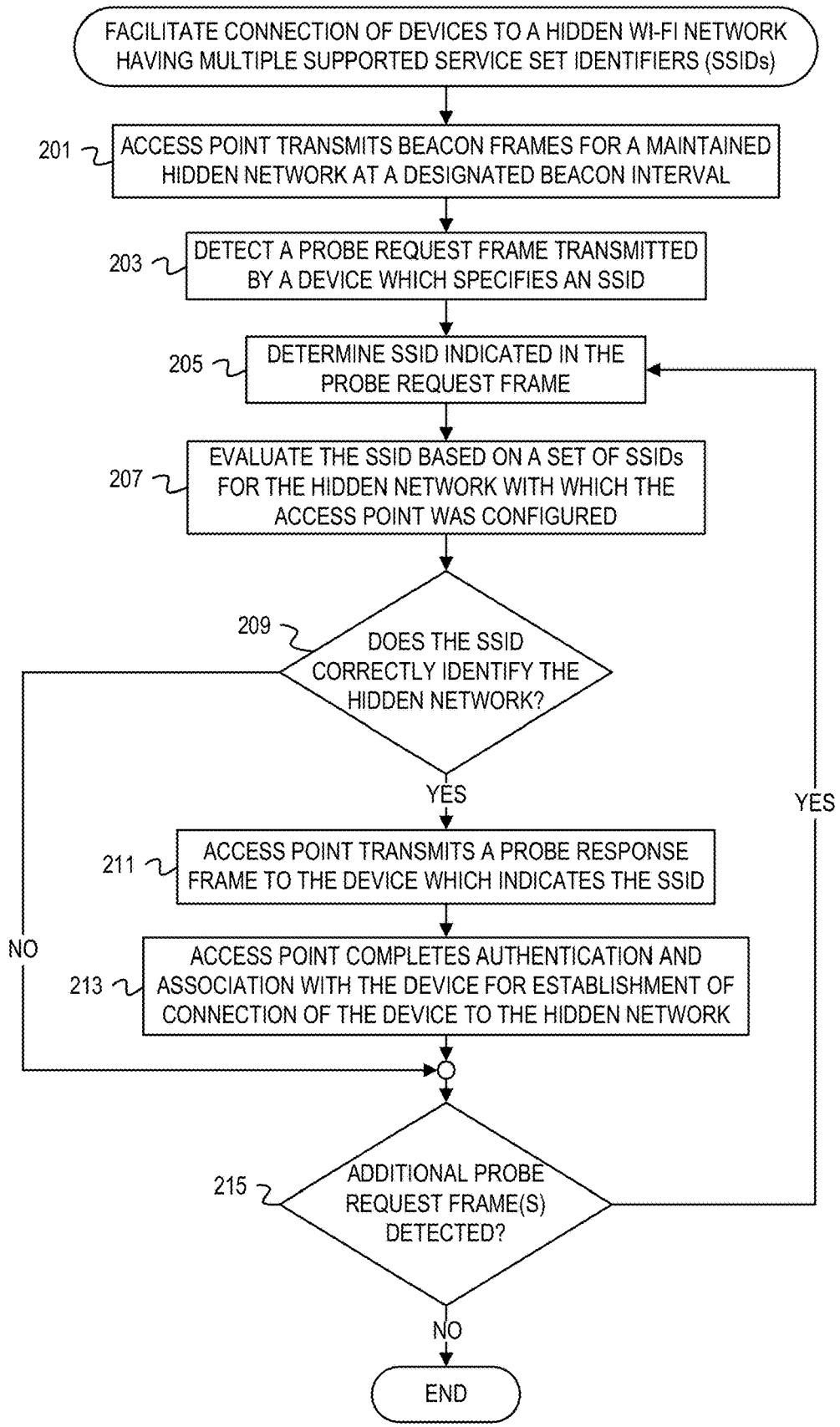
FIG. 2 depicts a flowchart of example operations for facilitating connection of devices to a hidden Wi-Fi network with one of several supported SSIDs.
Figure 3:
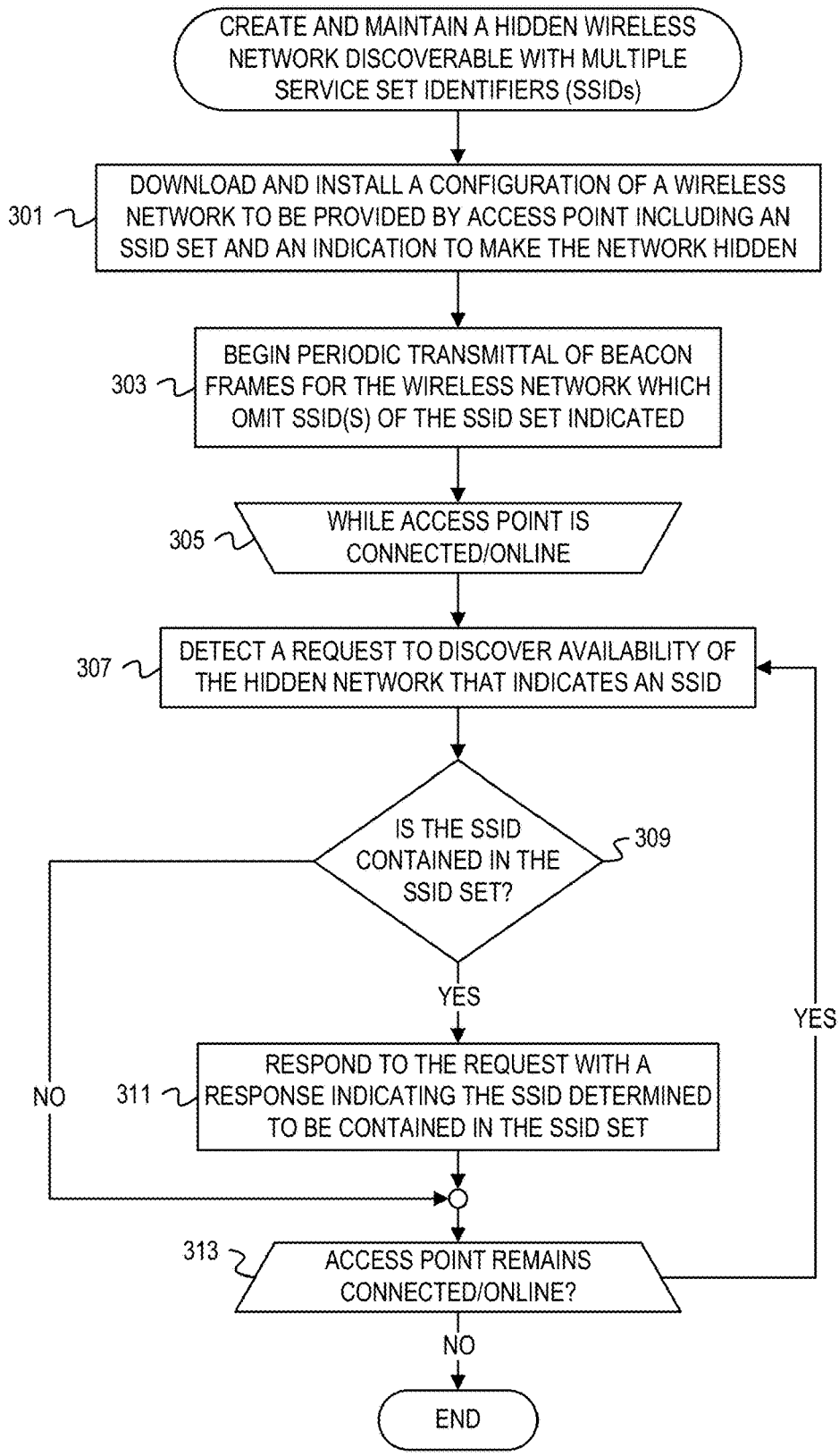
FIG. 3 is a flowchart of example operations for creating and maintaining a hidden wireless network that is discoverable with multiple SSIDs.

FIGS. 2-3 depict example operations for configuring and maintaining a hidden network that is accessible with any of multiple SSIDs. The example operations are described with reference to a multi-SSID hidden network configuration service (hereinafter "the service") for consistency with FIG. 1. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 depicts a flowchart of example operations for facilitating connection of devices to a hidden Wi-Fi network with one of several supported SSIDs. As described above, an access point providing the hidden network has been configured with a set of supported SSIDs with which the hidden network and access point have a one-to-many relationship. The access point may be a standalone hardware device connected to a router or may be incorporated as part of a router. The access point transmits a Wi-Fi signal so that Wi-Fi compatible devices in range can establish a wireless connection to the Internet via the access point.

At block 201, the access point transmits beacon frames for a hidden network which it maintains at a designated beacon interval. The beacon interval is the beacon interval designated in the corresponding field of the beacon frames (e.g., 100 TU). The beacon frames can be transmitted on the 2.4 gigahertz (GHz) frequency band and/or the 5 GHz frequency band depending on the capabilities of the access point and/or the associated router. Because the wireless network provided by the access point is a hidden network, the SSIDs which identify the network are omitted from the beacon frames. As a result, devices should provide a correct SSID when requesting availability or attempting discovery of the hidden network provided by the access point, where a correct SSID can include any of the SSIDs with which the access point was configured.

At block 203, the service detects a probe request frame transmitted by a device which specifies an SSID. The service can detect the probe request frame based on receipt of the probe request frame by the access point.

At block 205, the service determines the SSID indicated in the probe request frame. The service can determine the SSID indicated in the probe request frame based on the format of probe request frames which comport to WLAN protocol (e.g., based on known offsets/indices).

At block 207, the service evaluates the SSID based on a set of SSIDs for the hidden network with which the access point was configured. The set of SSIDs may be stored in a data structure maintained by the access point which the service installed on the access point as a result of downloading a configuration for the hidden network (e.g., a configuration file(s)), where the hidden network is discoverable by any of the SSIDs in the set. The evaluation can include searching the set of SSIDs for the SSID to determine if the SSID is contained in the set, performing string comparison between the SSID and each of the SSIDs in the set to determine if the strings match, etc.

At block 209, the service determines if the SSID correctly identifies the hidden network. The service determines that the SSID correctly identifies the hidden network if the SSID indicated in the probe request frame is included in the set of SSIDs as identified from the evaluation of the SSID based on the set of SSIDs. If the SSID correctly identifies the hidden network, operations continue at block 211. If the SSID does not correctly identify the hidden network, the access point will not respond to the device, and operations continue at block 215.

At block 211, the access point transmits a probe response frame to the device which indicates the SSID. The probe response frame comports to WLAN protocol and includes the same SSID as that by which the device attempted to discover the hidden network in the frame body. At block 213, the access point completes authentication and association with the device for establishment of the connection of the device to the hidden network. During this process, if the connection is being secured, authentication/association can be completed according to the wireless security standard employed for the hidden network, such as WPA-Personal or WPA-Enterprise security. If WPA-Enterprise security is being used for the hidden network, each of the SSIDs in the set of SSIDs should indicate an authentication server (e.g., by identifying or referencing a RADIUS server profile). The authentication server which is used to complete user authentication prior to establishment of a network connection is that identified or referenced by the SSID indicated in the probe request frame, probe response frame, and/or association request frame. The network connection which the device subsequently establishes after successful user authentication/authorization will be associated with the individual SSID which was used to discover availability of the hidden network. As a result, the access point and service can facilitate and maintain network connections for multiple different devices which use different SSIDs which are associated with the same hidden network defined on a single BSSID.

At block 215, the service determines if one or more additional probe request frames transmitted by other devices are detected. While depicted as occurring after one or blocks 209 or 213, determining whether an additional probe request is detected can be ongoing (e.g., as long as the access point is online). For instance, the operations depicted at blocks 203 to 213 can be performed at least partially in parallel or concurrently as different probe request frames are transmitted to the access point by different devices seeking to discover availability of the hidden network. If an additional probe request frame is detected, operations continue at block 205. If no additional probe request frame has been detected, operations are complete, though the service may wait (e.g., remain idle) until detection of a subsequent probe request frame until the access point is taken offline.

FIG. 3 is a flowchart of example operations for creating and maintaining a hidden wireless network that is discoverable with multiple SSIDs. As described above, an access point on which the service executes provides wireless networks using Wi-Fi.

At block 301, the service downloads and installs a configuration of a wireless network to be provided by the access point. The configuration at least includes an indication that the wireless network should be hidden and a set of the multiple SSIDs which name the wireless network. The set of multiple SSIDs can be represented as a data structure to be maintained by the access point as a result of installation of the configuration. These details of the network configuration may have been provided as input by a user, network administrator, etc. on an access point setup/configuration page accessed via the Internet Protocol (IP) address of the access point. The indication that the wireless network should be hidden may be a selection to hide the network, to disable SSID broadcasting for the network, etc. and configures the wireless network as a hidden network. The configuration which is downloaded and installed can also include a designation of a security mode and corresponding parameter values for the hidden network. As an example, the configuration can designate WPA/WPA2/WPA3-Personal security as well as a password value. As another example, the configuration can designate WPA/WPA2/WPA3-Enterprise security. In this case, each of the SSIDs in the set can indicate a corresponding RADIUS server or other authentication server to be used for user authentication. For instance, each of the SSIDs may be associated with an identifier or label of a RADIUS server profile that includes server IP address, service type (authentication and/or accounting), etc. The RADIUS server eventually employed for user authentication is the server associated with the SSID by which the hidden network was discovered. Download and installation of the configuration creates a multi-SSID hidden wireless network on the access point, which is hereinafter referred to as the "hidden network."

At block 303, the access point begins periodic transmittal of beacon frames for the hidden network which omit the SSIDs from the SSID set installed thereon. The access point transmits the beacon frames at a frequency corresponding to the beacon interval specified in the MAC header of the beacon frames. SSIDs in the SSID set are omitted from the beacon frames which are transmitted so the names by which the hidden network is identifiable are hidden. At block 305, operations continue while the access point is connected and online, such as based on connection to a wired network device (e.g., a router or modem) with an Ethernet cable.

At block 307, the service detects a request to discover availability of the hidden network, where the request indicates an SSID. The request may be a probe request frame transmitted by a Wi-Fi compatible device that is in range of the access point. The service can detect the request based on detection of the probe request frame by the access point.

At block 309, the service determines if the SSID indicated in the request is contained in the SSID set. The service can perform a string compare, string search, etc. between the SSID determined from the request and the SSIDs of the SSID set to determine if the SSID matches one of the SSIDs with which the hidden network was configured. For instance, the service can search the data structure which stores the SSIDs of the set for the SSID indicated in the request, can compare the SSID indicated in the request to each of the SSIDs stored in the data structure, etc. The SSID is determined to be contained in the SSID set if the SSID matches any of those in the SSID set (e.g., based on matching one of the SSIDs stored in the data structure). If the SSID is contained in the SSID set, operations continue at block 311. Otherwise, operations continue at block 313.

At block 311, the service response to the request with a response indicating the SSID that was determined to be contained in the SSID set. The service can respond to the request by initiating transmittal of a probe request frame by the access point to the device corresponding to the request. The probe response frame indicates the same SSID which was indicated in the probe request frame so that connectivity to the hidden network for the device will be established using that SSID.

At block 313, operations continue if the access point remains connected/online. If the access point is connected/online, operations continue at block 307. Otherwise, if the access point is disconnected or offline, operations are complete. Operations can commence again once the access point is reconnected or is brought back online.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 2, the operations depicted in blocks 205-213 can be performed in parallel or concurrently as the access point detects probe request frames transmitted from different devices. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
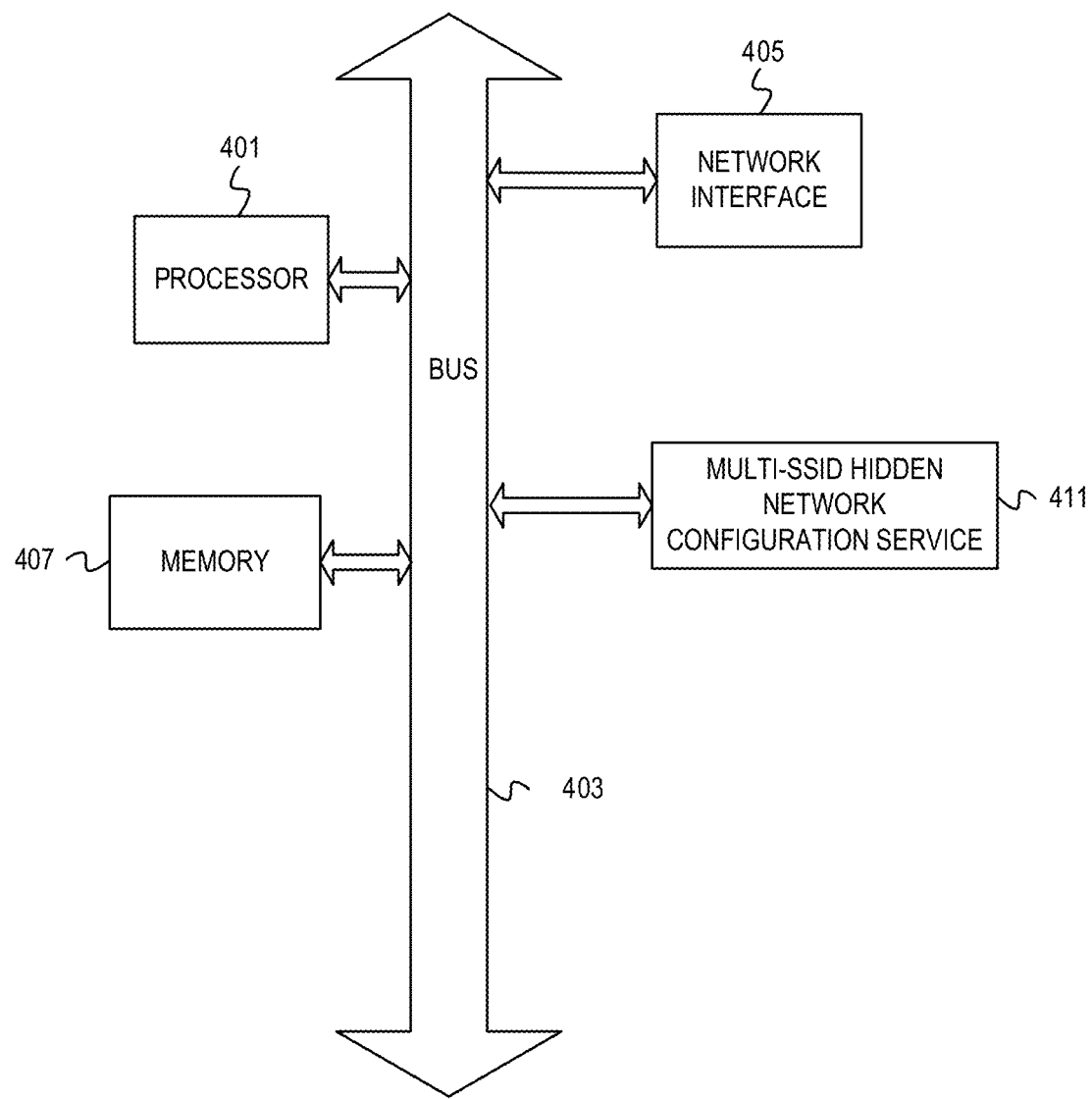
FIG. 4 depicts an example computer system with a multi-SSID hidden network configuration service.

FIG. 4 depicts an example computer system with a multi-SSID hidden network configuration service. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes multi-SSID hidden network configuration service 411. The multi-SSID hidden network configuration service 411 provides for creation and maintenance of a hidden wireless network discoverable by any of multiple SSIDs such that different client devices of the hidden wireless network may have discovered the network with different SSIDs. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for configuring and maintaining a multi-SSID hidden wireless network as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   detecting, by a network device which makes available a hidden wireless network, a first probe request transmitted from a first device that indicates a first service set identifier (SSID), wherein the hidden wireless network was configured with a set of SSIDs, and wherein the hidden wireless network is discoverable with any SSID in the set of SSIDs;
   determining if the first SSID correctly identifies the hidden wireless network, wherein determining if the first SSID correctly identifies the hidden wireless network comprises determining if the first SSID is included in the set of SSIDs based, at least in part, on evaluating the first SSID against the set of SSIDs;
   based on determining that the first SSID correctly identifies the hidden wireless network, transmitting a first probe response to the first device, wherein the first probe response comprises an indication of the first SSID;
   detecting a second probe request transmitted from a second device, wherein the second probe request indicates a second SSID that differs from the first SSID;
   determining if the second SSID correctly identifies the hidden wireless network, wherein determining if the second SSID correctly identifies the hidden wireless network comprises determining if the second SSID is included in the set of SSIDs based, at least in part, on evaluating the second SSID against the set of SSIDs; and based on determining that the second SSID correctly identifies the hidden wireless network, transmitting a second probe response to the second device, wherein the second probe response comprises an indication of the second SSID.

2. The method of claim 1, wherein evaluating the first SSID against the set of SSIDs comprises searching the set of SSIDs for the first SSID or comparing the first SSID to each SSID in the set of SSIDs, and wherein evaluating the second SSID against the set of SSIDs comprises searching the set of SSIDs for the second SSID or comparing the second SSID to each SSID in the set of SSIDs.

3. The method of claim 2, wherein determining that the first SSID correctly identifies the hidden wireless network comprises determining that the first SSID is included in the set of SSIDs based on the searching or the comparing, and wherein determining that the second SSID correctly identifies the hidden wireless network comprises determining that the second SSID is included in the set of SSIDs based on the searching or the comparing.

4. The method of claim 1, wherein the set of SSIDs comprises a plurality of different SSIDs, wherein the plurality of different SSIDs at least includes the first and second SSIDs.

5. The method of claim 1, wherein detecting the first probe request comprises detecting a probe request frame, and wherein transmitting the first probe response comprises transmitting a probe response frame.

6. The method of claim 1, wherein the network device is a wireless access point or a router which comprises a wireless access point.

7. The method of claim 1, wherein the set of SSIDs is indicated in configuration data maintained by the network device, wherein the configuration data indicates a configuration of the hidden wireless network.

8. The method of claim 7, wherein the configuration data further comprises, for at least a subset of the set of SSIDs, at least one of indications of security modes and indications of authentication servers corresponding to respective ones of the SSIDs.

9. The method of claim 8, wherein the indications of authentication servers comprise Internet Protocol (IP) addresses of different Remote Authentication Dian-In User Service (RADIUS) servers.

10. One or more non-transitory machine-readable media comprising program code for a network device to make available a hidden wireless network that is discoverable with multiple service set identifiers (SSIDs), the program code to:

detect first and second probe requests to discover the hidden wireless network transmitted from respective first and second devices, wherein the first probe request indicates a first SSID and the second probe request indicates a second SSID, wherein the second SSID differs from the first SSID;

determine whether the first and second probe requests correctly identify the hidden wireless network based on evaluation of the first and second SSIDs against a set of SSIDs maintained by the network device wherein the program code to determine whether the first and second probe requests correctly identify the hidden wireless network comprises program code to evaluate the first and second SSIDs against the set of SSIDs to determine whether the first and second SSIDs are included in the set of SSIDs, wherein the hidden wireless network was configured with the set of SSIDs and is discoverable with any SSID in the set of SSIDs;

based on a determination that the first SSID is included in the set of SSIDs, transmit a first probe response to the first device, wherein the first probe response indicates the first SSID; and based on a determination that the second SSID is included in the set of SSIDs, transmit a second probe response to the second device, wherein the second probe response indicates the second SSID.

11. The non-transitory machine-readable media of claim 10, wherein the program code to evaluate the first and second SSIDs against the set of SSIDs, comprises program code to search the set of SSIDs for each of the first and second SSIDs or program code to compare the first and second SSIDs to each SSID in the set of SSIDs.

12. The non-transitory machine-readable media of claim 10, wherein the program code to detect the first and second probe requests comprises program code to detect first and second probe request frames, wherein the program code to transmit the first probe response comprises program code to transmit a first probe response frame, and wherein the program code to transmit the second probe response comprises program code to transmit a second probe response frame.

13. The non-transitory machine-readable media of claim 10 further comprising program code to:

detect a third request to discover the hidden wireless network, wherein the third request indicates a third SSID;

determine whether to respond to the third request based on evaluation of the third SSID against the set of SSIDs; and based on a determination that the third SSID is not included in the set of SSIDs, determine not to respond to the third request.

14. The non-transitory machine-readable media of claim 10, wherein the program code to maintain the set of SSIDs by the network device comprises program code for the network device to maintain a data structure which stores the set of SSIDs, and wherein the program code to determine that the first SSID is included in the set of SSIDs comprises program code to determine that the first SSID matches an SSID stored in the data structure.

15. The non-transitory machine-readable media of claim 10 further comprising program code to download and install a configuration of the hidden wireless network, wherein the configuration of the hidden wireless network comprises at least one of indications of security modes and indications of authentication servers to be used when connecting to the hidden wireless network via corresponding ones of at least a subset of the set of SSIDs.

16. A network device comprising:
a processor; and
a computer-readable medium having instructions stored thereon that are executable by the processor to cause the network device to,
detect a first probe request that indicates a first service set identifier (SSID) transmitted from a first device, wherein the network device makes available a hidden wireless network that was configured with a set of SSIDs, and wherein the hidden wireless network is discoverable with any SSID in the set of SSIDs;
determine if the first SSID correctly identifies the hidden wireless network based, at least in part, on evaluation of the first SSID against the set of SSIDs to determine if the first SSID is included in the set of SSIDs;
based on a determination that the first SSID correctly identifies the hidden wireless network, transmit a first probe response to the first device, wherein the first probe response comprises an indication of the first SSID;
detect a second probe request transmitted from a second device, wherein the second probe request indicates a second SSID that differs from the first SSID;
determine if the second SSID correctly identifies the hidden wireless network based, at least in part, on evaluation of the second SSID against the set of SSIDs to determine if the second SSID is included in the set of SSIDs; and
based on a determination that the second SSID correctly identifies the hidden wireless network, transmit a second probe response to the second device, wherein the second probe response comprises an indication of the second SSID.

17. The network device of claim 16,
wherein the instructions executable by the processor to cause the network device to evaluate the first SSID against the set of SSIDs comprise instructions executable by the processor to cause the network device to search the set of SSIDs for the first SSID or to compare the first SSID to each of the SSIDs in the set, and
wherein the instructions executable by the processor to cause the network device to determine that the first SSID correctly identifies the hidden wireless network comprise instructions executable by the processor to cause the network device to determine that the first SSID is included in the set of SSIDs based on the search or the comparison.

18. The network device of claim 16,
wherein the instructions executable by the processor to cause the network device to detect the first probe request comprise instructions executable by the processor to cause the network device to detect a probe request frame, and
wherein the instructions executable by the processor to cause the network device to transmit the first probe response comprise instructions executable by the processor to cause the network device to transmit a probe response frame.

19. The network device of claim 16, wherein the network device comprises a wireless access point.

20. The network device of claim 16 further comprising instructions executable by the processor to cause the network device to download and install a configuration of the hidden wireless network, wherein the configuration of the hidden wireless network comprises at least one of indications of security modes and indications of different authentication servers to be used when connecting to the hidden wireless network via corresponding ones of at least a subset of the set of SSIDs.

* * * * *